United States Patent

[11] 3,579,782

| [72] | Inventor | Stig Lennart Hallerback<br>Blodboksgatan 12, Vastra Frolunda, Sweden |
|---|---|---|
| [21] | Appl. No. | 749,783 |
| [22] | Filed | Aug. 2, 1968 |
| [45] | Patented | May 25, 1971 |

[54] METHOD OF MANUFACTURING ROLLING BEARING COMPONENTS
6 Claims, 8 Drawing Figs.

[52] U.S. Cl. .................................................. 29/148.4,
29/417
[51] Int. Cl. ..................................................... B23p 11/00,
B23p 17/00
[50] Field of Search ............................................ 29/148.4,
149.5, 148.4 (C), (Bend), (Roll), 417; 113/117

[56] References Cited
UNITED STATES PATENTS

| 2,591,160 | 4/1952 | Kilian ........................... | 29/148.4X |
| 2,719,765 | 10/1955 | Menne .......................... | 29/148.4 |
| 2,737,707 | 3/1956 | Highet et al. ................. | 29/149.5 |

*Primary Examiner*—Thomas H. Eagen
*Attorney*—Howson and Howson

ABSTRACT: A method of manufacturing rolling bearing components consisting of the steps of forming a tubular member by bending up a flat sheet and joining the sheet at confronting edges, separating the tubular member into a plurality of annular rings, and simultaneously rolling and bending at least one flange at one end of said annular ring at grooved portions formed by rolling.

PATENTED MAY 25 1971
3,579,782
SHEET 2 OF 2
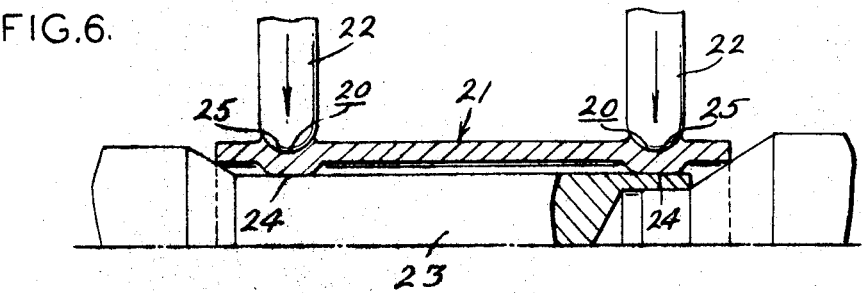
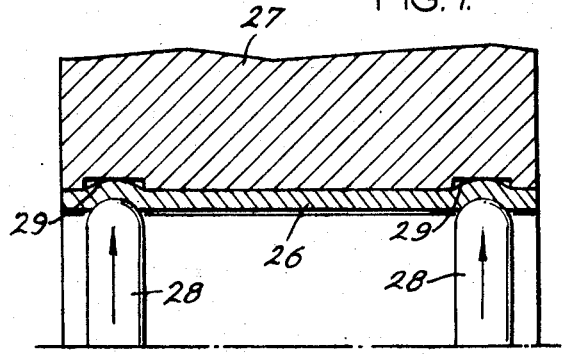
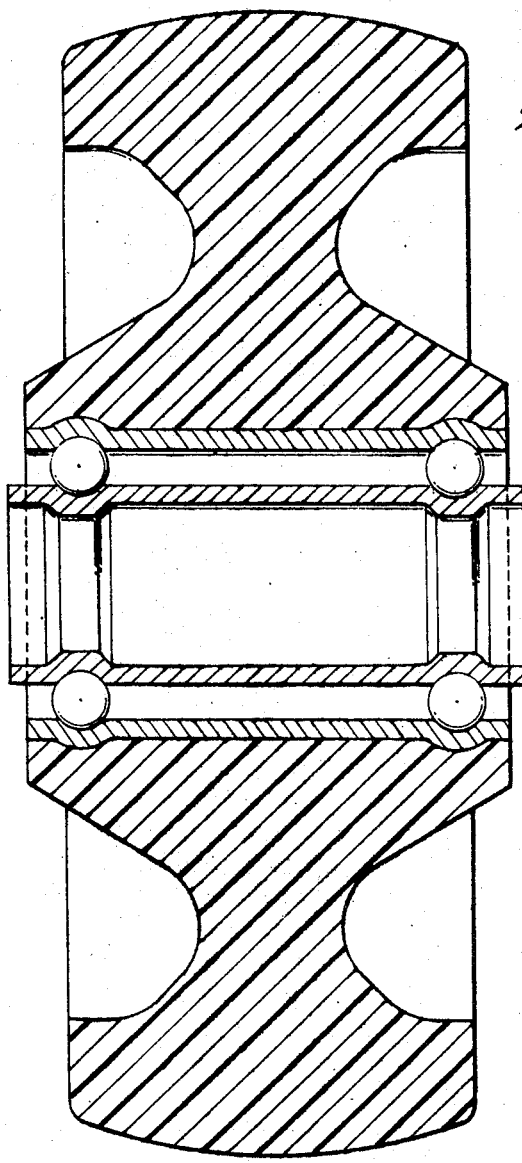
INVENTOR:
STIG LENNART HALLERBÄCK
BY Howson & Howson
ATTYS.

METHOD OF MANUFACTURING ROLLING BEARING COMPONENTS

The present invention refers to a novel and improved method of manufacturing rolling bearing components.

According to previously used methods for the manufacture of, for example, race rings for rolling bearings, tubular elements are cut from steel tubes or bars in a suitable manner, whereupon these elements are worked until a ring of approximately the desired dimensions is obtained. When the ring is intended to be used in ball bearings, the working will also include the shaping of a groove in one of the cylindrical surfaces of the ring adapted to serve as a raceway for the balls. The ring is finally heat-treated and ground to desired finish.

This method, however, suffers from certain disadvantages. The tube material is comparatively expensive, and in order to obtain the desired dimensions, working operations will bring about considerable losses of material. Simpler methods of producing bearing rings have been proposed in which a tubular element cut from a tube manufactured in conventional manner is used whereupon grooves are formed in the cylindrical surfaces by means of a suitable operation. Unworked tubes of this kind will, however, not be of satisfactory quality with respect to out-of-roundness, and variations in wall thickness, and are therefore not well suited for manufacture of bearing rings having raceways formed by a rolling operation as extra working operations will be required to obtain a bearing component having the desired properties.

According to the present invention it is now proposed a novel method of manufacturing rolling bearing components which is characterized by the following steps, forming a tubular member, cutting the tubular member into suitable lengths to constitute the required components, providing each of said components with one or more circumferential grooves by a rolling operation on the internal or external cylindrical surface, respectively, and/or likewise by rolling with at least one flange located at an angle to any of said cylindrical surfaces.

The invention will below be described with reference to the attached drawings, on which FIG. 1 schematically shows part of the working operations according to the method, FIGS. 2 to 7 show various kinds of rolling operations according to the invention, FIG. 8 shows a bearing the race rings of which are designed according to the method.

FIG. 1 shows the basic steps of obtaining the components, the portion denoted by 1 shows the sheet blank in its original shape. The blank preferably consists of a strip of sheet steel, and this is within the portion denoted by 2 by means of suitable automatically working machinery, not shown here, formed into a tubular member.

The right-hand part of this portion includes automatic welding apparatuses for joining the juxtaposed edges of the sheet. Within portion 3 the tubular member is cut into rings 4 of suitable lengths of form the bearing components. A tubular component manufactured in this manner has many advantages compared to a tube manufactured in conventional manner, noticeably very small deviations from the circular cross section and an even wall thickness. It is therefore possible to produce rolling bearing components in finished shape solely by the steps according to the invention.

FIGS. 2 to 7 show various forms of the last step of the manufacturing process, i.e. the rolling operation.

FIG. 2 shows the rolling of an outer ring 5 for a rolling bearing which is to be provided with two flanges, the operation is performed as so-called outwardly directed rolling, the flanges being pressed outwards by means of a tool 6 working against an outer die, which preferably is divided.

Figure 1:
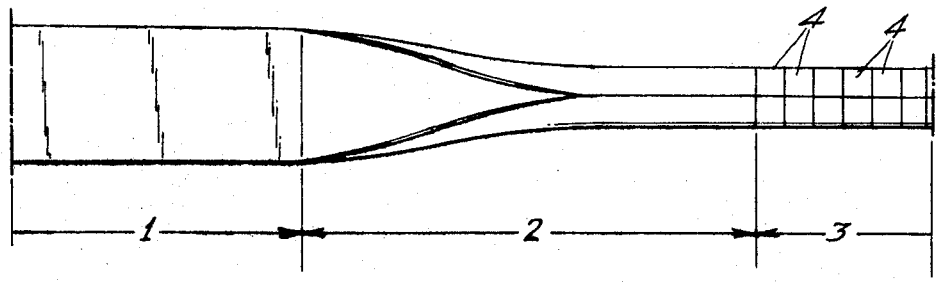
Figure 2:
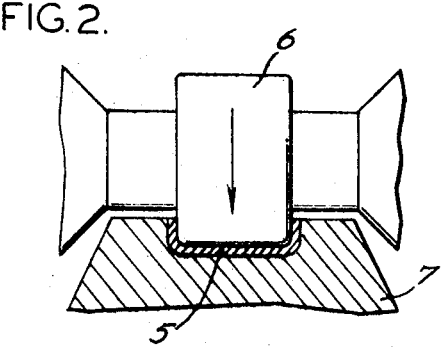
Figure 3:
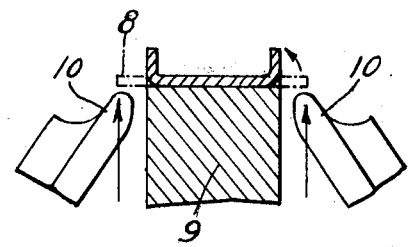

During rolling operation according to FIG. 3 the tubular component 8 (shown in dotted lines) is mounted in a holder 9, whereupon the edges of the component by means of rolling tools 10 are forced inwards in such a manner that a bearing ring having two flanges is obtained.

Figure 4:
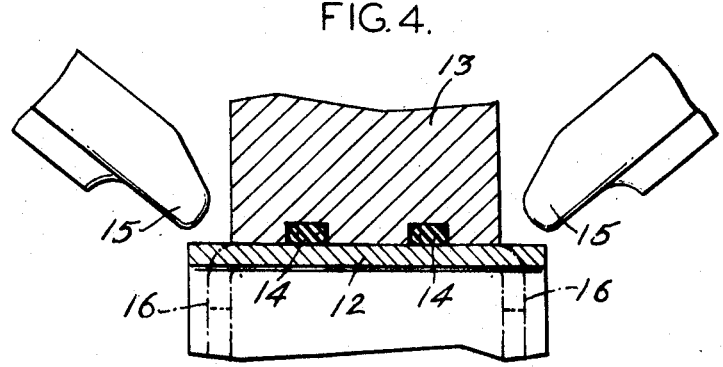
Figure 5:
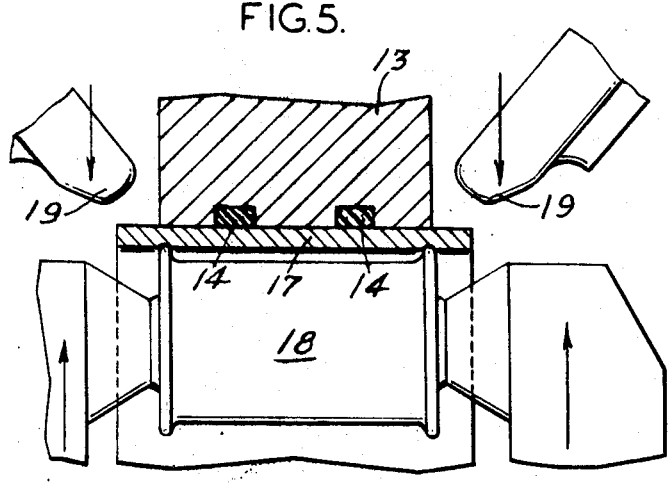

FIGS. 4 and 5 show outwardly directed rolling for forming the ring. FIG. 4 shows how a tubular component 12 is mounted in a holder 13 without any internal support. In order better to retain the component during the rolling operation the holder preferably is provided with O-ring elements 14. By means of the rolling tools 15 the edges of the component are bent in such a manner that a bearing ring having flanges 16 (denoted by dash lines) is obtained. In order to obtain an exact shape of the ring it may be advantageous to provide a shallow groove to serve as bending indication at the appropriate part of the ring. FIG. 5 shows an inwardly directed rolling operation using an internal support. The tubular component is mounted in a holder similar to that according to FIG. 4 and is at the portion to be bent supported by a rotating member 18 the flange or flanges being rolled down by means of a tool 19. Also in this embodiment it may be advantageous to provide an indicating groove as mentioned in connection with FIG. 4. It is also possible to perform an inwardly directed rolling by using a fixed internal support. It is further possible to perform the operation as a combined rolling and pressing step. The rolling operations according to FIGS. 2 to 5 are not limited to any definite angle between the cylindrical part of the ring and the flange, and it is possible to produce inner as well as outer ring members for the bearing and provide with one or two flanges.

It is also possible to manufacture other types of bearing components according to the present method, for example cages for roller or needle bearings having slots for the rolling bodies. The sheet blank will then be provided with series of punched pockets. This blank is formed into a perforated tube, the edges are welded together and the tube is cut into cage elements of suitable length in such a manner that an annular unbroken portion remains at one or both ends of the element. In this manner a cage of open or of closed type is obtained, thereafter the rolling operation is performed in such a manner that the annular portion or portion is or are given a small inclination in relationship to the perforated cylindrical part of the cage.

FIG. 6 shows a rolling operation according to the invention during which one or more raceways 20 by means of a tool 22 working in conjunction to a mandrel 23 are rolled into a ring member 31 which is adapted to serve as an inner ring of a ball bearing. In order to obtain a satisfactory result of an acceptable tolerance at 25 it is necessary that the member is pressed against a fixed support at 24. With an inner ring produced according to this method the noticeable advantage is obtained that the ring, when mounted on the shaft, will be in contact with the same only at the ridges denoted by 24, and appearing at the back of the raceways. In this manner fine grind tolerances at the ring and at the shaft, respectively, are eliminated. FIG. 7 shows the rolling of an outer ring for a bearing of last-mentioned type. During this step the ring member 26 is mounted in a fixed holder 27 and the raceway or raceways are formed by means of tools 28. The holder is provided with grooves 29 adapted to accommodate the ridges formed during this operation. These ridges will fulfill the same purpose as indicated in connection with the inner ring according to FIG. 6.

FIG. 8 shows a double-row ball bearing mounted in a small wheel and where the outer and inner ring, respectively, have been manufactured according to the invention. In this design the body of the wheel preferably is made of plastics, rubber or the like, whereby the body is cast or extruded directly onto the outer ring of the bearing. The ridges of the outer ring described in connection with FIG. 7 will then aid in retaining the wheel body on the ring.

I claim:

1. A method of manufacturing rolling bearing components consisting of the steps of forming a tubular member by bending up a flat sheet and joining the sheet at confronting edges, separating the tubular member into a plurality of annular rings, and simultaneously rolling and bending at least one flange at one end of said annular ring at grooved portions formed by rolling.

2. A method of manufacturing rolling bearing components consisting of the steps of forming a tubular member by bending up a flat sheet and joining the sheet at confronting edges, separating the tubular member into a plurality of annular rings, and simultaneously rolling and bending flanges at opposite ends of said annular ring at grooved portions formed by rolling.

3. A method as claimed in claim 1 including forming the sheet blank with a series of punched pockets.

4. A method as claimed in claim 1 wherein the edges are joined by welding.

5. A method as claimed in claim 3 wherein the rings are separated to provide unbroken portions at least at one axial end of said pockets.

6. A method as claimed in claim 3 wherein the rings are separated to provide unbroken portions at opposite axial ends of said pockets.